United States Patent

Flinchbaugh

[15] 3,662,859
[45] May 16, 1972

[54] STAIRWAY ELEVATOR

[72] Inventor: Henry K. Flinchbaugh, 930 Arlington Road, York, Pa. 17403

[22] Filed: Sept. 21, 1970

[21] Appl. No.: 73,760

[52] U.S. Cl. ................................. 187/12, 187/10, 187/14, 187/88
[51] Int. Cl. ......................................... B66b 9/06
[58] Field of Search ............................. 187/10, 12, 13, 14, 88

[56] References Cited

UNITED STATES PATENTS

| 3,312,307 | 4/1967 | Camp | 187/10 |
| 2,528,265 | 10/1950 | Cretors | 187/12 |
| 1,178,505 | 4/1916 | Fak | 187/14 |

FOREIGN PATENTS OR APPLICATIONS

| 1,119,460 | 7/1968 | Great Britain | 187/12 |

*Primary Examiner*—Joseph Wegbreit
*Assistant Examiner*—Merle F. Maffei
*Attorney*—Paul & Paul

[57] ABSTRACT

In a stairway elevator unit riding on tubular tracks mounted on the steps of a stairway, a carriage riding on the tracks and carrying a car frame, the car frame and carriage being driven by a motor powered winch which winds or unwinds a cable anchored at the top of the stairway, so as to raise or lower the elevator unit, the car frame being supported on the carriage by a support assembly, the position of which is controlled by the cable so as to support the car frame upward and outward from the inclined track when the cable is taut, and to drop the car frame downward and inward toward engagement with the inclined tracks when the cable is not taut. The support mechanism comprises an idler pulley normally supported by the cable, the idler pulley being mounted on an idler shaft, and a two member toggle controlled by the idler shaft and pivotably interconnecting the car frame and the carriage shaft. A channeled track member rigidly attached to the car frame rides on the carriage shaft such that when the cable is taut, the toggle holds the carriage shaft in position at the rear of the channel member, thus carrying the car frame in a forward and elevated position; when the cable is not taut, the toggle positions the carriage shaft to the front of the channel member, thus carrying the car frame in a backward and lowered position, engaging wedge members of the car frame with the tubular track so as to lock the car frame on the track and hold it securely. Movement of the car frame downward with respect to the carriage also activates an override safety switch which, when activated, prevents further drive by the motor.

7 Claims, 7 Drawing Figures

PATENTED MAY 16 1972

INVENTOR.
Henry K. Flinchbaugh
BY
Paul & Paul
ATTORNEYS.

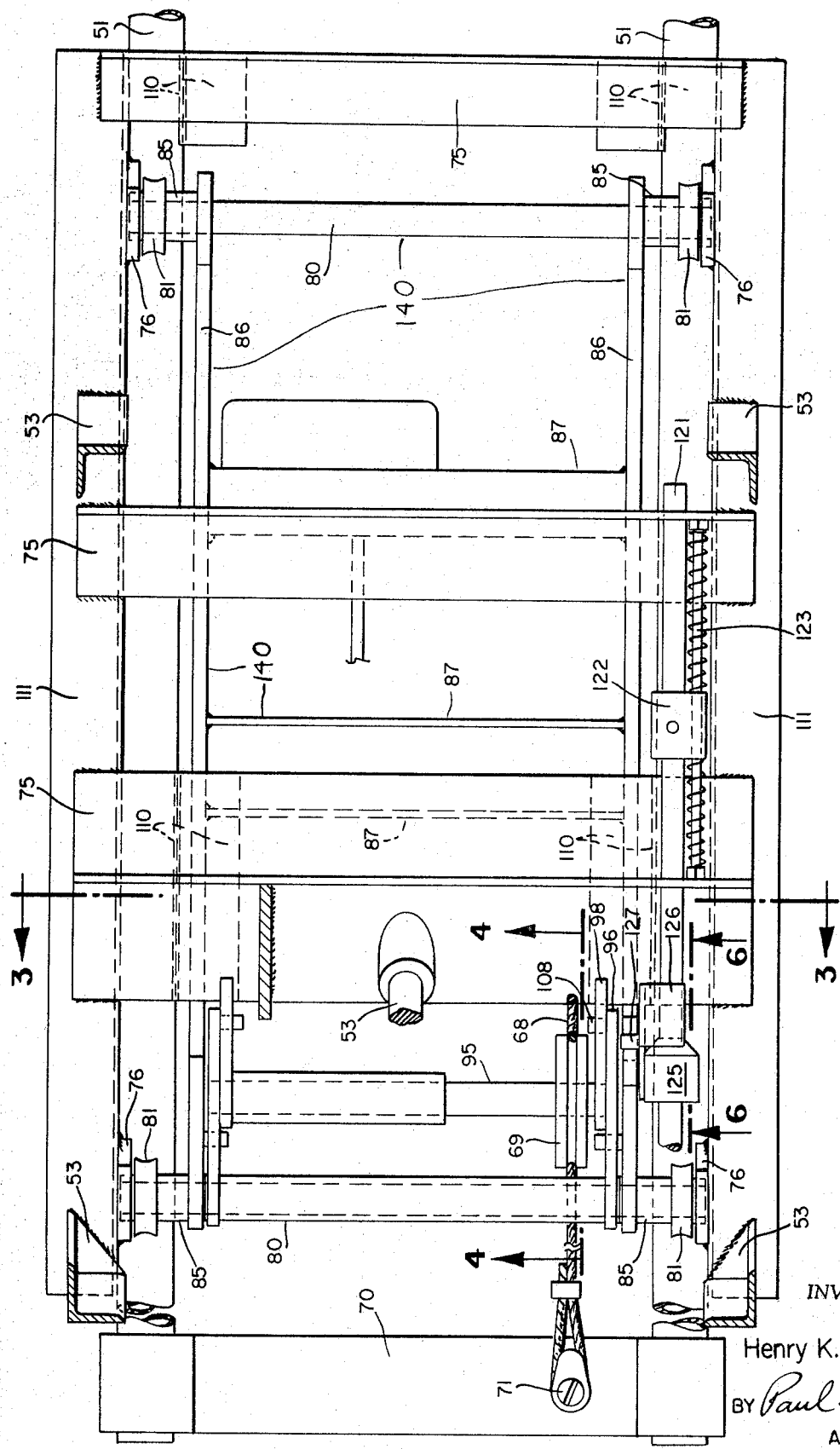

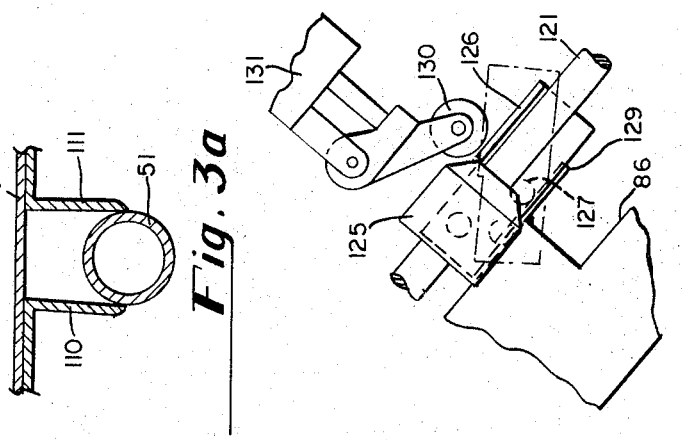
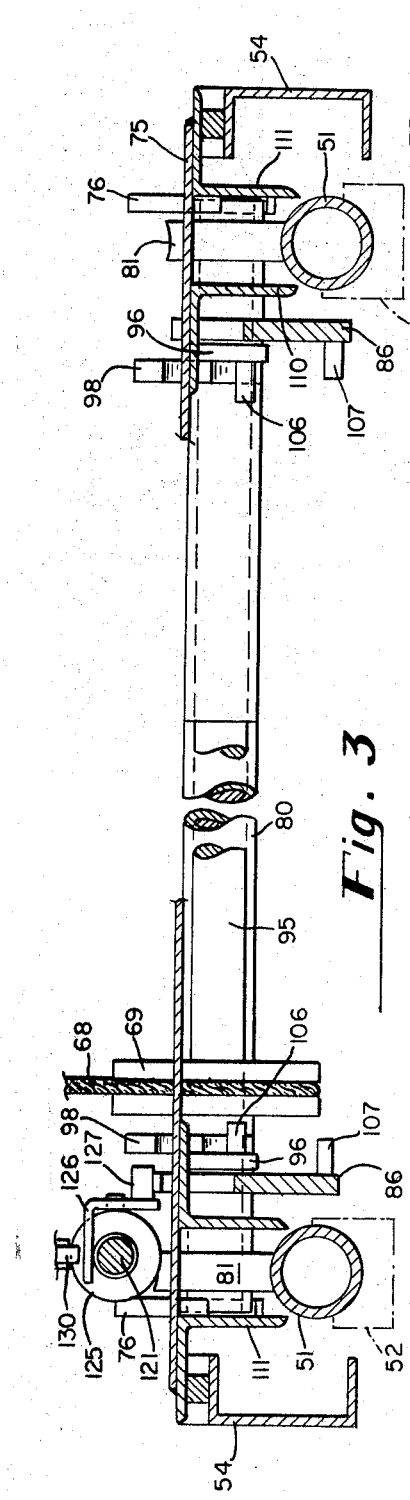
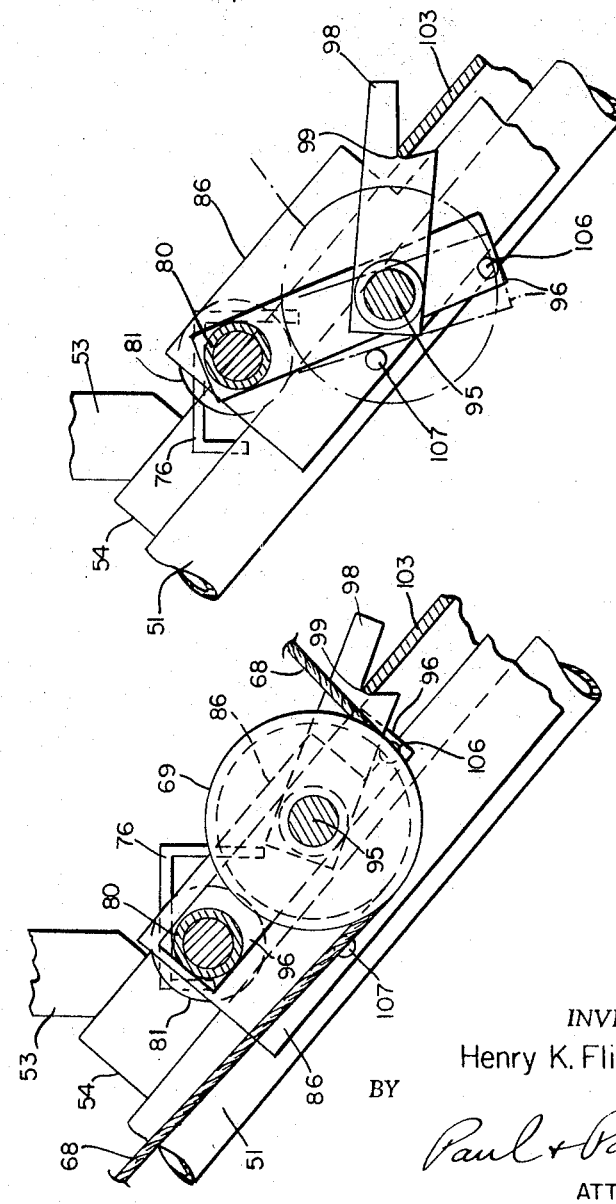
INVENTOR.
Henry K. Flinchbaugh
BY
Paul & Paul
ATTORNEYS.

STAIRWAY ELEVATOR

BACKGROUND OF THE INVENTION

1. Field of the Invention

This invention relates to inclined elevator structures, and more particularly to a passenger elevator adapted for installation in a stairway in a dwelling or the like.

2. Description of the Prior Art

Stairway elevators for carrying passengers up and down stairways or other inclined planes are generally designed for installation in private dwellings, but may be used wherever it is desired to transport persons from one level to another. Such elevators must be of a rugged and efficient construction, must be of a simplified design such as to be adapted to an existing condition, such as a stairway, and particularly must incorporate safeguards to prevent the elevator from cascading downward. The primary users of such elevators are aged or infirm persons who can tolerate very little in the way of physical trauma and, accordingly, must be able to rely absolutely on the safety of the elevator.

The design of safety features into stairway-type elevators has necessarily been of great importance in past and existing stairway elevator systems. One design approach is to provide a governor, or speed monitor, in combination with clamping means controlled by such governor, to brake the elevator descent when a speed in excess of a predetermined safe speed is detected. See U. S. Pat. No. 2,888,099. However, such a design approach has the obvious deficiency of permitting the elevator to gather downward momentum before braking occurs, with the possibility of a severe jolt to the rider when the brake is applied.

A more common design approach is to actuate a safety brake mechanism in response to the slackening of the main cable. If the safety mechanism is highly responsive to slackening of such cable, there is a minimum time loss in effecting braking. However, existing safety brake mechanisms within this class of design contain spring-actuated mechanisms which themselves are subject to failure, and consequently do not provide the degree of security desired. For example, U. S. Pat. No. 2,950,948 discloses a safety mechanism attached to the carriage of the elevator unit, and controlled by the main elevator cable. When the cable is in its normally taut condition, it holds a second cable in a tightened condition, which cable in turn holds spring actuated wedges free of the carriage wheels, However, if the cable slackens, the second cable is freed, permitting movement of the wedges which are spring driven along the rails, causing the carriage wheels to ride up onto the wedges, thereby locking the carriage. The safety mechanism relies initially on a leaf spring clamp which holds the second cable in place, and secondarily on the strength of the springs which drive the wedges into position. Further, the wedges themselves normally slide on the rail, which sliding with time reduces the coefficient of friction between such wedges and the rail, thereby lessening the braking effect of such braking system. U.S. Pat. No. 2,950,948 thus discloses a safety braking mechanism which, by the complexity of its numerous elements, introduces unreliability.

Another example of a brake mechanism actuated by cable slack is shown in U. S. Pat. 2,674,347. The safety mechanism there depends upon spring tension, and relies upon a spring-powered wedge to brake the elevator unit. This device attempts to utilize simply the power of a spring actuated brake to counteract the downward force of the elevator and the weight it carries. U. S. Pat. No. 2,619,195 discloses a similar coil spring safety brake arrangement.

From the above discussion of prior art devices, it is seen that there is a critical need for a stairway elevator having a safety braking mechanism responsive to the condition of the elevator cable, which braking mechanism combines the following features:

1. It is of simple design, and does not introduce a complicated mechanism which itself is vulnerable and subject to failure; and 2. Utilizes directly the weight of the elevator unit and the load it carries to provide the braking force, rather than externally mounted force-providing members.

SUMMARY OF THE INVENTION

The primary object of this invention is to provide a stairway elevator having a safety brake mechanism automatically activated by slackening of the elevator cable, the mechanism acting to drop the car frame with respect to the carriage such that the frame wedges onto the elevator rails.

It is another object of this invention to provide a safety braking mechanism for a stairway elevator which is simple and reliable and which utilizes the weight of the elevator car to provide braking force.

It is a further object of this invention to provide a simple mechanical braking mechanism for a stairway elevator which is actuated when the cable which drives such elevator slackens, and which incorporates a safety switch for shutting off the elevator power at the same time the safety braking mechanism is operated.

Accordingly, the invention comprises a pair of parallel tubular rails adapted for mounting on any size or shape of inclined stairway, a carriage mounted on the rails and a car frame in turn mounted on the carriage, and a motor powered cable assembly for raising and lowering the carriage and car frame along the rails. The cable assembly comprises a cable anchored at the upper end of the stairway and wound, at its other end, around a cable reel, the cable passing around and holding in position an idler pulley which is part of a moveable support through which the car frame is supported on the carriage. When the cable is in a taut condition, the idler pulley is held forward and upward from the rails, the idler pulley positioning a toggle which interconnects the carriage and the car frame such that the car frame is held at an uppermost position with respect to the rails. When the cable is slack, the toggle is permitted to retract such that the car frame is positioned rearward and downward with respect to the carriage so that wedge members firmly fixed to the car frame lockingly wedge onto the inclined rails. The downward movement of the car frame with respect to the carriage activates a safety switch fixedly mounted on the car frame.

BRIEF DESCRIPTION OF THE DRAWINGS

FIG. 2 is a plan view of the structure taken along lines 2—2 of FIG. 1.

FIG. 3 is a side view taken along lines 3—3 of FIG. 2.

FIG. 4 is a close up view of the support assembly of this invention when the elevator cable is taut.

FIG. 5 is a close up view of the support assembly of this invention when the elevator cable is slack.

FIG. 6 is a close up view of a safety switch mechanism taken along lines 6—6 as shown in FIG. 2.

DETAILED DESCRIPTION OF THE INVENTION

Figure 1:
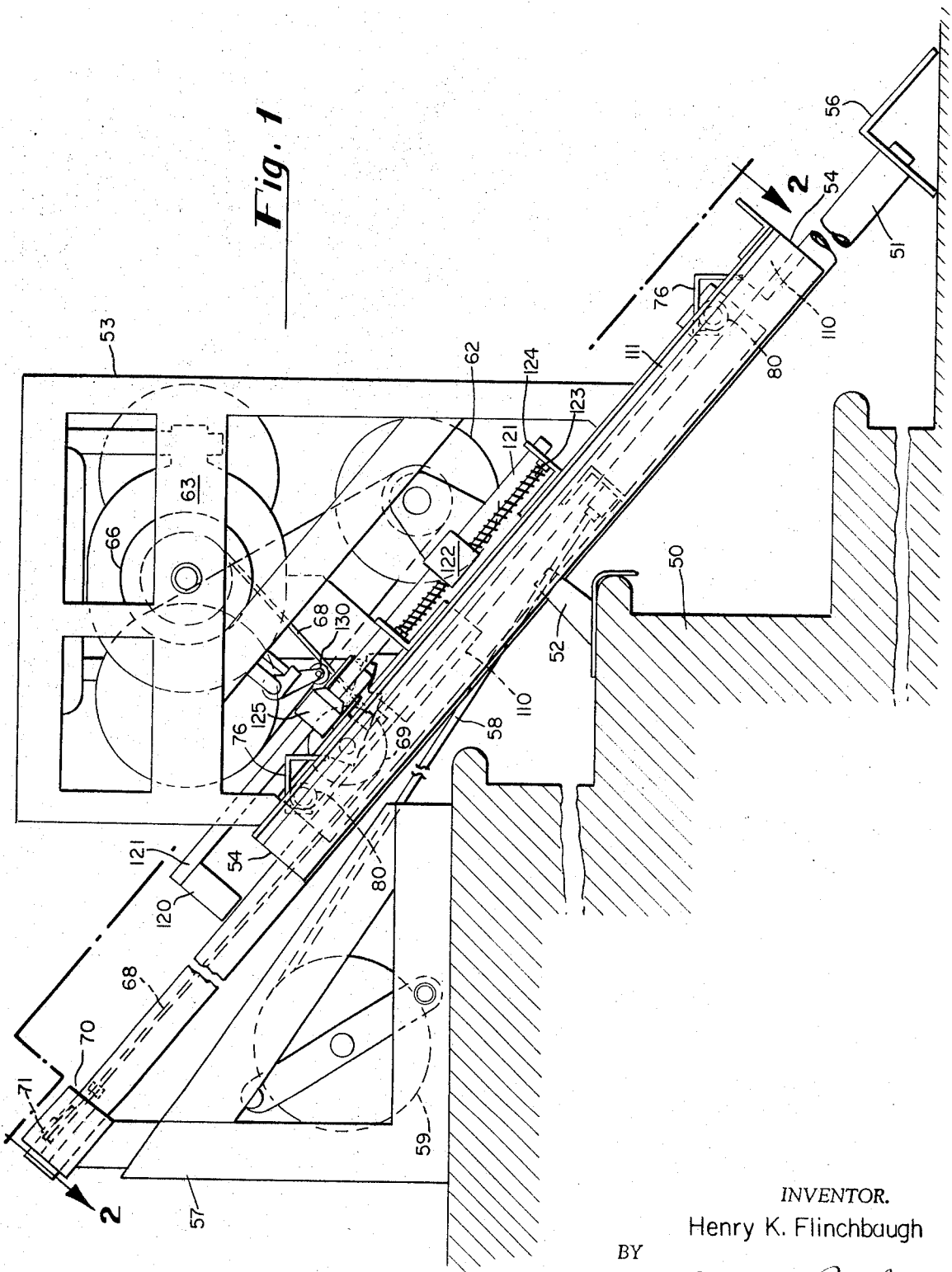
FIG. 1 is a side elevation view of the stairway elevator structure of this invention.

Referring now to FIG. 1, a side elevation view is shown of a section of track mounted on a stairway 50 with the elevator unit of this invention mounted thereon. A circular, or tubular rail, or track 51 is shown mounted on stairway 50 by saddle units 52. A plurality of such saddle units will be used to accommodate the entire length of rail. As shown in FIG. 2, a pair of tubular rails are preferably employed, the rails running the length of the stairway and being mounted at the bottom end to a fixture 56 and at the top end to a fixture 57. The tubular rail is stronger by weight, easy to assembly and attractive for use in a home. The rail may be assembled from a plurality of tubular units, each being constructed to interfit into the end of another, such that any length of stairway may be accommodated. In the specification to follow, the discussion will deal only with a two-rail assembly, it being understood that other forms of rail assemblies are within the scope of this invention. Further, the terms track and rail will be used interchangeably.

A car frame 53, which carries the elevator user, is mounted on and carried by a carriage 140, shown in detail in FIG. 2, the carriage in turn riding on the track assembly. Car frame 53 has a side channel 54 attached thereto, the side channel being positioned such that it runs parallel to the rail assembly. As can be visualized from FIG. 1, the car, mounted on a carriage, may be driven up and down the stairway, being limited in its movement only at the top and bottom thereof. An electrical cable 58 provided by a spring-biased reel 59 provides electrical power, through additional wiring not shown, to a reversible electric motor 62, of any suitable type. Motor 62 drives a cable reel 66 through conventional pulley and gear reduction mechanisms 63. It is understood that any convenient drive mechanism may be adapted which will drive the cable reel 66 at the desired speed. Cable reel 66 is appropriately grooved around its periphery to accommodate thereon a cable 68. Cable 68, which is wound on reel 66, is passed around an idler pulley, as shown in FIG. 4, and hence upward roughly parallel to the rail assembly to cross element 70, where it is attached by suitable anchor means 71. The cable thus supports the car frame on the rail assembly, the position of the car frame depending upon the amount of cable wound onto reel 66. If the motor is driven so as to rotate reel 66 in a direction which causes the cable to unwind, the increased length of the unwound cable permits the elevator to slide down the track assembly. Alternately, when the motor is driven in a direction such as to wind, or take up cable, the car is pulled up the rail assembly. This feature of powering a stairway-type elevator unit is widely used in the art, and by itself does not constitute the invention as claimed.

The structure of the carriage which rides on the rail assembly and which carries the main car frame, as well as the bottom portion of the car frame in position with respect to the carriage, is best seen in FIG. 2. On each side of the car, and running the length of the car, are flange members 111, to which are rigidly attached cross members 75, the channels 111 and members 75 thus forming the base of the main car frame on which the remainder of the frame 53 is supported. The car frame rides on, but is not rigidly attached to a carriage which is comprised principally of front and back carriage axles 80 which support carriage wheels 81, and longitudinal carriage members 86, each of which members runs lengthwise and is attached to the front and back axles. Additional cross members 87 attach to and rigidly hold members 86, with spacers 85 being employed to prevent members 86 from moving in an axial direction.

The support of the car frame on top of the carriage is provided through U-shaped elements 76, which are welded or otherwise rigidly attached to flange members 111, and which seat on top of axles 80. The manner in which the U-frame members ride on top of axles 80 is seen more clearly in FIG. 1. The two side portions of U-shaped member 76 are vertically positioned and are displaced a distance of approximately 2 widths of the carriage axle 80. The upper, or cross portion, extends horizontally. The members 76, four in total, are integrally coupled together through the car frame, and permit the car frame to be moved forward or backward with respect to the carriage axles 80, the axle 80 supporting the upper portion and being contained in its relative movement by the two side portions. In FIG. 1, the car frame is in the normal forward position, such that the back portion of each U-shaped member 76 is in contact with its respective carriage axle 80. When and if the car frame is permitted to move backward, or toward the carriage and rail assembly, the forward portion of U-shaped member 76 contains its respective axle 80, such that the entire car frame is shifted relatively backward and downward with respect to the rail assembly. This action will be better understood with reference to the description of FIGS. 4 and 5 below.

Referring now to FIG. 4, a close up view is shown of the support mechanism holding the car frame in a forward position with respect to the carriage, when the cable 68 is taut. Cable 68 is shown engaging idler 69, which idler is supported on idler shaft 95. Idler shaft 95, which runs transversely across the carriage, is in turn connected at each end to a toggle comprised of elements 96 and 98. Element 96 is pivoted at one end about carriage axle 80, and is connected at the other end to idler shaft 95. Toggle element 98 is pivoted at one end to idler shaft 95, and is engaged at its keyed receiving portion 99 with a contact element 103 which is mounted on the car frame. Element 98 thus connects, or engages the car frame at its receiving portion 99, such that the toggle interconnects the car frame and the carriage.

The center pivot point of the toggle, idler axle 95, is normally held in the position shown in FIG. 4 by the tautness of cable 68. Stop pin 106 mounted on member 96 engages the lower edge of toggle 98 at the toggle position shown such that element 96 pushes carriage axle 80 against the backward portion of U-shaped member 76. It is thus seen that, in the normal taut condition of the cable, the two member toggle causes a maximum displacement of carriage axle 80 with respect to the tip of contact element 103, causing maximum forward and upward displacement of the entire car frame with respect to the carriage and the rail assembly on which the carriage rides.

Referring now to FIG. 5, the condition is shown wherein the cable 68 has slackened. The slackening of the cable causes idler 69 and idler shaft 95 to drop toward the rail assembly, there being no restraining force. The downward movement of idler shaft 95 pulls down both members 96 and 98 of the toggle at the point where they are connected to the shaft 95, causing the toggle to assume a "V" angle and lessen the distance between the pivot edge of element 103 and the carriage shaft 80. It is to be remembered that the carriage wheels 81 will remain riding on the tracks, such that the effect of the toggle movement in bringing the carriage forward and upward with respect to the car frame is actually to bring the car frame backward and downward with respect to the carriage which remains firmly seated on the rails. This is shown in FIG. 5, it being clearly shown that the backward and downward movement of the car frame brings it closer to rail 51. Stop pin 107 mounted on carriage member 86 limits the downward movement of toggle member 96.

In review of the discussion above of FIGS. 4 and 5, it is seen that when the cable is in its normally taut condition, the car frame is held in a forward and outward position with respect to the rail 51. In this condition, the two toggle members are held extended at almost 180° with respect to each other, thus forcing the pivot edge of frame member 103 away from carriage axle 80, whereby the car frame is held outward and upward from the carriage and the rail assembly. When the cable 68 slackens, the unjoined ends of the two toggle members are permitted to angle toward each other, with the result that the car frame moves backward and downward toward the rail assembly.

Referring now to FIG. 3, it can be seen how the downward movement of the car frame with respect to the rail assembly is used for braking purposes. The right angle flange members 111 run the length of the car frame, parallel to the rails, and are positioned to the outside of each of the two rails. Right angle flange members 110 are rigidly attached to the car assembly, having downward portions parallel to the rails and positioned on the inside side of rails 51. There are four such flange members 110, as located on FIG. 2. The distance between the downward portions of flange members 111 and 110 is made slightly less than the outside diameter of rails 51. In a normal position, as shown in FIG. 3, the two downward extending portions of flange members 110 and 111 have their bottom-most edges above rails 51. However, when the car frame is allowed to drop with respect to the rail assembly, these two members engage rail 51 in a wedging manner, as shown clearly in FIG. 3a. It is this wedging action, with the entire weight of the car frame and passenger thereon pushing the wedge members against rail 51, which effectively brakes the motion of the elevator as soon as the cable 68 slackens.

It is to be observed that there are no extraneous actuating mechanisms intervening between the slackening of cable 68 and the braking of the elevator due to the car frame wedging upon the rails. When the cable slackens, the idler pulley and shaft fall of their own weight, and the toggle retracts such that the car frame also falls of its own weight directly upon the rails. Thus, the braking action is swift and reliable, and is dependent only upon the weight of the car frame which reliably will force the car frame into a wedged and locked position upon the rail assembly.

Further advantage is taken of the dropping of the car frame with respect to the carriage to actuate a switch which turns off motor 62 whenever the cable slackens. As seen in FIGS. 1–3, a limit stop rod 121, carrying a limit element 120, is slideably supported on flange brackets 124, which in turn are mounted on the car frame. A cam 125, rigidly mounted on stop rod 121 has pivoted thereon a right angle flange member 126 which carries on the lower part thereof a pin 127. When the frame is in its normal position, pin 127 is above and not in contact with an element 129 which is mounted on longitudinal carriage member 86. When the cable slackens, causing the car frame to move downward with respect to the carriage, hinge member 126 is dropped downward, causing pin 127 to come into contact with member 129, and to be rotated upward. The position of hinge member 126, after the car frame has fallen, is shown in phantom in FIG. 6, showing that the entire member has dropped, and that it has been rotated upward about its hinged connection to cam 125. The upward rotation of hinge member 126 causes it to strike arm 130 which activates switch 131, which in turn turns off power to the motor. In this manner, at the same time that the elevator unit is braked by wedging onto the rail assembly, the motor is turned off so that there is no further cable movement. It is noted that limit rod 121 is also utilized to activate override switches not shown in the drawing.

An additional safety feature is provided by saddles 52, the cross sectional shape of which is seen clearly in FIG. 3. The inside edge of the saddle is constructed to come up above the center line of rail 51, such that flange member 110, when dropped due to cable slack, would be caught by the saddle if the frame were to move forward to a saddle position before wedging into place. Flange members 110 may be notched to handle the event where the car frame dropped directly onto a saddle, the notching permitting the saddle to catch and hold the car frame before the entire length of flange member 110 has passed by.

It is appreciated from the above that the main feature of this invention is the manner of retracting the car frame with respect to the carriage, such retraction being initiated by cable slack. While the preferred embodiment of this invention as shown utilizes a retractable support mechanism comprising an idler pulley and shaft, a two-member toggle, and a U-shaped member through which the car frame is carried on the carriage shaft, it is appreciated that like embodiments may be utilized to provide retractable support of the car frame upon the carriage, and are within the spirit and scope of this invention. It is to be appreciated that it is the relative movement of the car frame with respect to the carriage which permits the fast and reliable braking action, and any such retractable support means controlled by cable tension is embraced by this invention. Similarly, the form of safety switch mechanism shown is one of many equivalent mechanisms which may be employed to turn off the motor power when the car frame drops with respect to the carriage.

I claim:

1. An elevator structure adapted for an inclined stairway, comprising:
   a. a rail assembly mounted in said stairway, comprising at least one rail extending lengthwise along said stairway;
   b. a car frame having wedge members normally displaced from said rail;
   c. a carriage mounted on said rail assembly, for carrying said car frame;
   d. support means having a retractable member interconnecting said car frame and said carriage, for retractably supporting said car frame on said carriage;
   e. drive means for moving said car frame and said carriage having a normally taut cable, one end of said cable being anchored at the top of said stairway;
   f. said retractable member normally held in a position by said cable when said cable is taut such that said car frame is maintained at an elevated position with respect to said carriage and said rail assembly, whereby said wedge members are displaced from said rail, and said retractable member lowered to a lower position when said cable is slack such that said car frame is lowered with respect to said carriage, whereby said wedge members engage said rail and lock said car thereto; and
   g. said car frame comprising a pair of wedge members, each member having a flange extending downward from said car frame toward said rail, said flanges having bottom edges aligned parallel to said rail, a first flange being positioned to the right of the center axis of said rail and a second flange being positioned to the left of said center axis, the distance between said flanges being less than the outside diameter of said rail.

2. The elevator structure as described in claim 1, wherein said rail means is comprised of a pair of tubular rails.

3. The elevator structure as described in claim 2 wherein said carriage means comprises a pair of front wheels mounted on a front axle and a pair of rear wheels mounted on a rear axle, each of said wheels riding on one of said tubular rails, and said car frame comprises a pair of said wedge members corresponding to each of said carriage wheels.

4. The elevator structure as described in claim 2 wherein said rails are connected to said stairway by track saddles, each of said track saddles having a portion thereof extending above the level to which the lower tips of said wedge members fall when said cable is slack, thereby blocking downward passage of said car frame when said cable is slack.

5. The elevator structure as described in claim 4, wherein said support means comprises such a retractable member corresponding to each rail.

6. The elevator structure as described in claim 1 having safety switch means rigidly mounted on said car frame, said switch means comprising a pivotable member adjacent to but normally not contacting said carriage when said cable is taut, said pivotable member being displaced upward by contact with a fixed carriage member such as to close said switch when said cable is slack and said car frame is lowered with respect to said carriage.

7. An elevator structure for inclined stairways comprising:
   a. a rail assembly having tubular parallel rails running up and down said inclined stairway;
   b. a carriage assembly riding on said rail assembly, having at least one carriage shaft;
   c. a car frame supported on said carriage assembly, having pairs of wedge members depending downwardly, each of said wedge pairs being positioned above, but normally not contacting, a respective rail;
   d. a drive assembly having a cable connected at one end to a cable anchor mounted at the top of said stairway and at the other end to a cable reel on said car frame;
   e. an idler pulley mounted on an idler shaft, said pulley engaged by and held up by said cable when said cable is taut;
   f. a toggle, having two members each pivotably connected to said idler shaft, said first member also pivotably connected to said carriage shaft, and said second member having a receiving surface displaced from the connection to said idler shaft;
   g. a contact member rigidly mounted on said car frame adjacent to said second toggle member, said receiving surface pivotably receiving said contact member;
   h. a U-shaped support member rigidly mounted on said car frame having an upper portion slideably supported on said carriage shaft, and a front portion and a rear portion, and mounted at a distance from said contact member such that said carriage shaft is positioned against the rear portion of said U-shaped member when said cable is taut, thereby holding each of said wedge pairs above its respective rail, and such that said shaft is positioned against the front portion of said U-shaped member when said cable is slack, in which latter case said car frame is dropped relative to said carriage such that each of said wedge pairs wedges against said rail.

* * * * *